United States Patent
Bender et al.

(10) Patent No.: US 10,292,007 B2
(45) Date of Patent: *May 14, 2019

(54) NOTIFICATION OF ACCESS CONTROL REQUEST AND EXPLANATION INDICATIVE OF THE ACCESS CONTROL REQUEST ON A COMMUNICATION DEVICE

(71) Applicant: BlackBerry Limited, Waterloo (CA)

(72) Inventors: Christopher Lyle Bender, Kitchener (CA); Michael Grant Kirkup, Waterloo (CA); Michael Kenneth Brown, Fergus (CA); Radu Alexandru Manea, Waterloo (CA); Brian Alexander Zubert, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/845,489

(22) Filed: Dec. 18, 2017

(65) Prior Publication Data

US 2018/0124560 A1    May 3, 2018

Related U.S. Application Data

(63) Continuation of application No. 15/018,334, filed on Feb. 8, 2016, now Pat. No. 9,848,292, which is a
(Continued)

(51) Int. Cl.
*H04W 24/00* (2009.01)
*H04W 4/02* (2018.01)
(Continued)

(52) U.S. Cl.
CPC ............ *H04W 4/02* (2013.01); *G06F 21/554* (2013.01); *G06F 21/6218* (2013.01); *G08B 5/36* (2013.01);
(Continued)

(58) Field of Classification Search
CPC combination set(s) only.
See application file for complete search history.

(56) References Cited

U.S. PATENT DOCUMENTS 6,477,550 B1    11/2002    Balasubramaniam
2004/0136274 A1    7/2004    Mohler et al.
(Continued)

FOREIGN PATENT DOCUMENTS

WO    2007121392 A    10/2007

OTHER PUBLICATIONS

Trimble GPSBase/NetRS Installation Guide, Revision A, dated Apr. 2004.
(Continued)

*Primary Examiner* — Andrew W Bee
(74) *Attorney, Agent, or Firm* — Moffat & Co

(57) ABSTRACT

A communication device includes a display screen upon which information is displayed. A microprocessor configured to execute at least one notification program is provided that displays a notification descriptive of an access control request on the display screen. The at least one notification program is programmed to receive data indicative of an access control request and to receive data descriptive of the access control request. Additionally, the at least one notification program is further programmed to display a notification indicative of the access control request and comprising an explanation of the access control request based on the received descriptive data.

28 Claims, 7 Drawing Sheets

Related U.S. Application Data continuation of application No. 13/689,429, filed on Nov. 29, 2012, now Pat. No. 9,257,020, which is a continuation of application No. 12/040,401, filed on Feb. 29, 2008, now Pat. No. 8,335,500.

(51) Int. Cl.
*H04L 29/08* (2006.01)
*H04M 1/725* (2006.01)
*G06F 21/55* (2013.01)
*G06F 21/62* (2013.01)
*H04W 48/14* (2009.01)
*G08B 5/36* (2006.01)
*H04M 3/42* (2006.01)
*H04M 1/663* (2006.01)
*H04W 12/08* (2009.01)

(52) U.S. Cl.
CPC .............. *H04L 67/18* (2013.01); *H04L 67/36* (2013.01); *H04M 1/72522* (2013.01); *H04M 1/72572* (2013.01); *H04M 3/42* (2013.01); *H04W 48/14* (2013.01); *G06F 2221/2101* (2013.01); *H04M 1/663* (2013.01); *H04M 2250/10* (2013.01); *H04W 12/08* (2013.01)

(56) References Cited

U.S. PATENT DOCUMENTS

| | | |
|---|---|---|
| 2004/0176104 A1 | 9/2004 | Arcens |
| 2004/0224702 A1 | 11/2004 | Chaskar |
| 2005/0114694 A1 | 5/2005 | Wager et al. |
| 2006/0281553 A1 | 12/2006 | Hawkins et al. |
| 2007/0111743 A1 | 5/2007 | Leigh et al. |
| 2007/0155489 A1 | 7/2007 | Beckley et al. |
| 2007/0281689 A1 | 12/2007 | Altman et al. |
| 2007/0294530 A1 | 12/2007 | Zlotnick |
| 2007/0298784 A1 | 12/2007 | Yamashita et al. |
| 2008/0015549 A1 | 1/2008 | Maughan |
| 2009/0005018 A1 | 1/2009 | Forstall et al. |
| 2009/0006699 A1 | 1/2009 | Rofougaran |
| 2009/0036148 A1 | 2/2009 | Yach |
| 2010/0233995 A1 | 9/2010 | Gopalaswamy et al. |

OTHER PUBLICATIONS

Sunbelt Kerio, Personal Firewall 4—User guide, 2006, 122 pages.
"Sunbelt Kerio—Personal Firewall4 (User Guide)" Internet Article, [Online] pp. 1-121, XP002491364 Retrieved from the Internet: URL:http://www.sunbelt-software.com/Kerio/docs/sunbelt_kerio_personal_firewall_user_guide.pdf> [retrieved on May 25, 2006].
Software installation by Nokia, dated Feb. 5, 2006.
Roadsync using Exchange ActiveSync by DataViz, dated Mar. 2, 2007.
ArcPad Handheld Cheat Sheet, by Giselle Block, dated Jun. 22, 2006.
TeleNav v2.0 for GPS-enabled JAVA phones, Auto GPS Navigation for Nextel Java Phones User's Guide, dated Apr. 1, 2003.
MSDN—Authorization Structures. http://msdn2.microsoft.com/en-us/library/aa375780(VS.85).aspx . Retrieved May 4, 2012.

NOTIFICATION OF ACCESS CONTROL REQUEST AND EXPLANATION INDICATIVE OF THE ACCESS CONTROL REQUEST ON A COMMUNICATION DEVICE

CROSS-REFERENCE TO RELATED APPLICATION

This application is a continuation of U.S. application Ser. No. 15/018,334, filed Feb. 8, 2016, which is a continuation of U.S. application Ser. No. 13/689,429, filed Nov. 29, 2012, and issued as U.S. Pat. No. 9,257,020 on Feb. 9, 2016, which is a continuation of U.S. application Ser. No. 12/040,401, filed Feb. 29, 2008, and issued as U.S. Pat. No. 8,335,500 on Dec. 18, 2012, all of which are entirely incorporated by reference herein.

FIELD

This disclosure, in a broad sense, is directed toward an electronic device that has communication capabilities. The present disclosure further relates to providing a notification of an access control request and an explanation of the access control request on a display screen of a communication device.

BACKGROUND

With the proliferation of communication systems, compatible handheld communication devices are becoming more prevalent, as well as advanced. Examples of communication devices include both handheld communication devices as well as larger devices such as laptop computers, desktop computers and the like. These devices are capable of sending and receiving a variety of different messages including but not limited to short message service (SMS), multimedia message service (MMS), emails, voice messages, and the like. In addition, the communication devices may run various applications that may attempt to access device resources. In some cases, the applications may have been developed or supplied by third-party vendors rather than the communication device manufacturer.

BRIEF DESCRIPTION OF THE DRAWINGS

Exemplary methods and arrangements conducted and configured according to the advantageous solutions presented herein are depicted in the accompanying drawings wherein.

DETAILED DESCRIPTION

Figure 1:
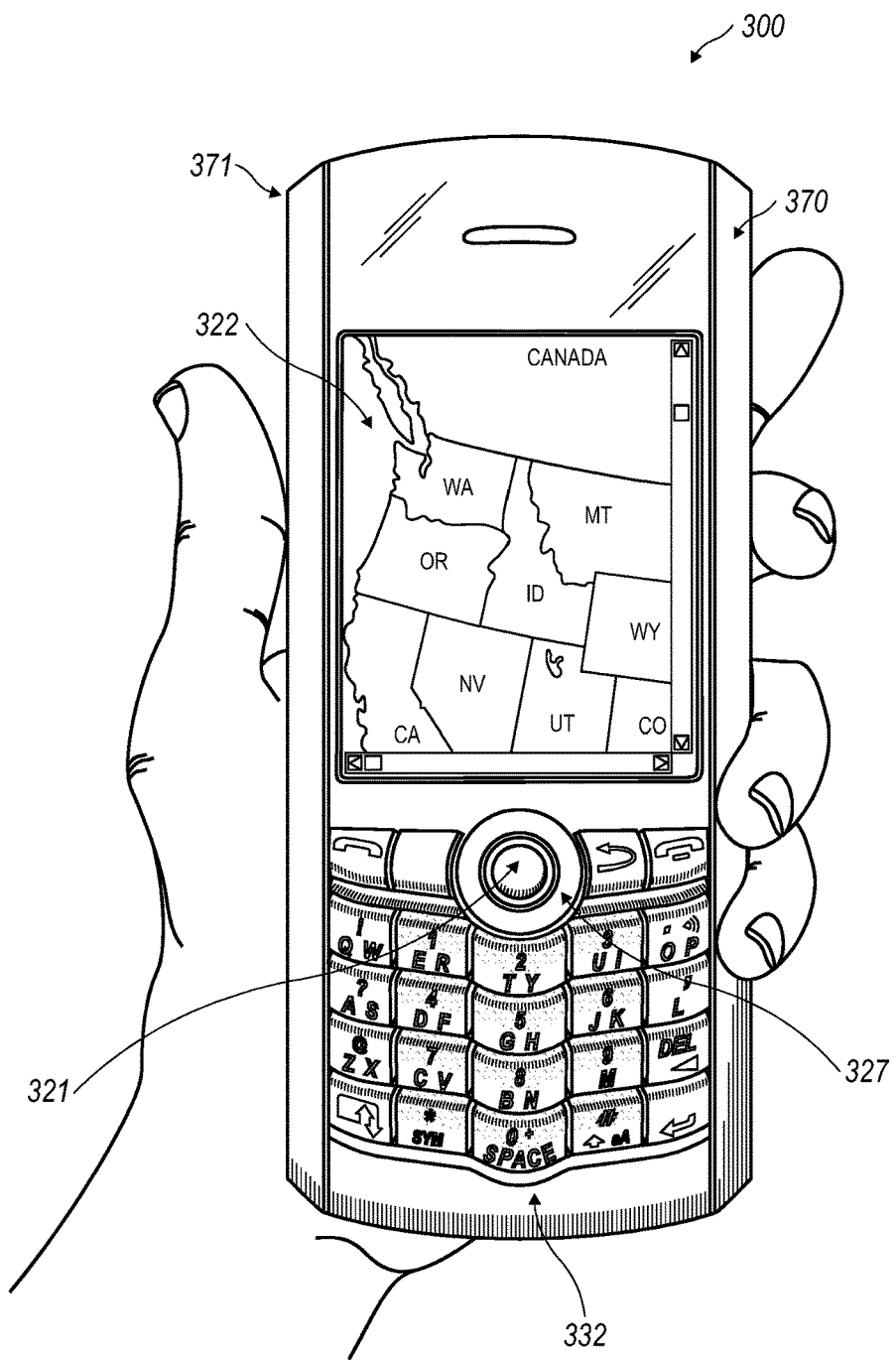
FIG. 1 illustrates an exemplary communication device according to various embodiments of the present disclosure.
Figure 9:
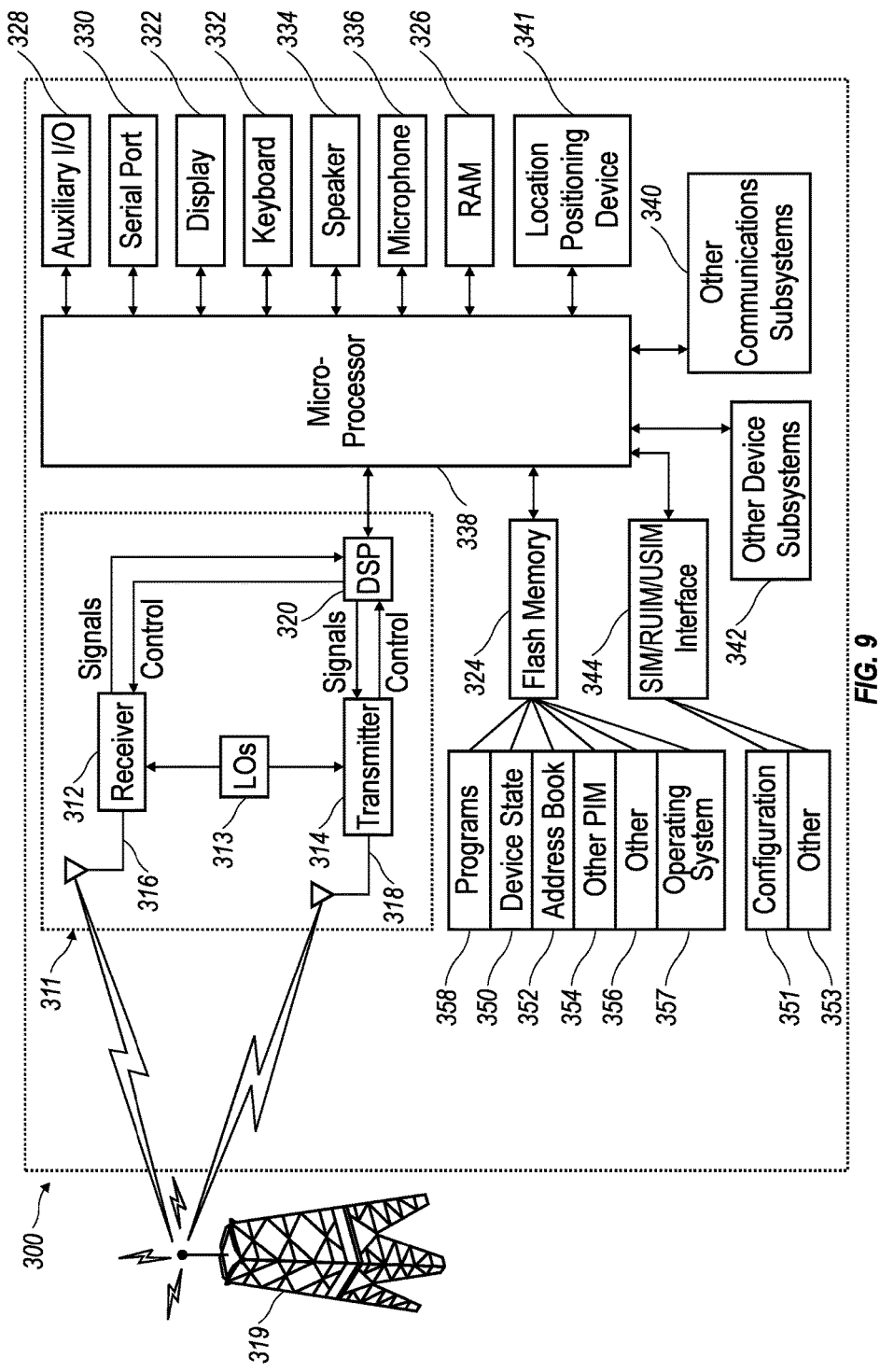
FIG. 9 is a block diagram representing an exemplary wireless handheld communication device interacting in a communication network.
Figure 10:
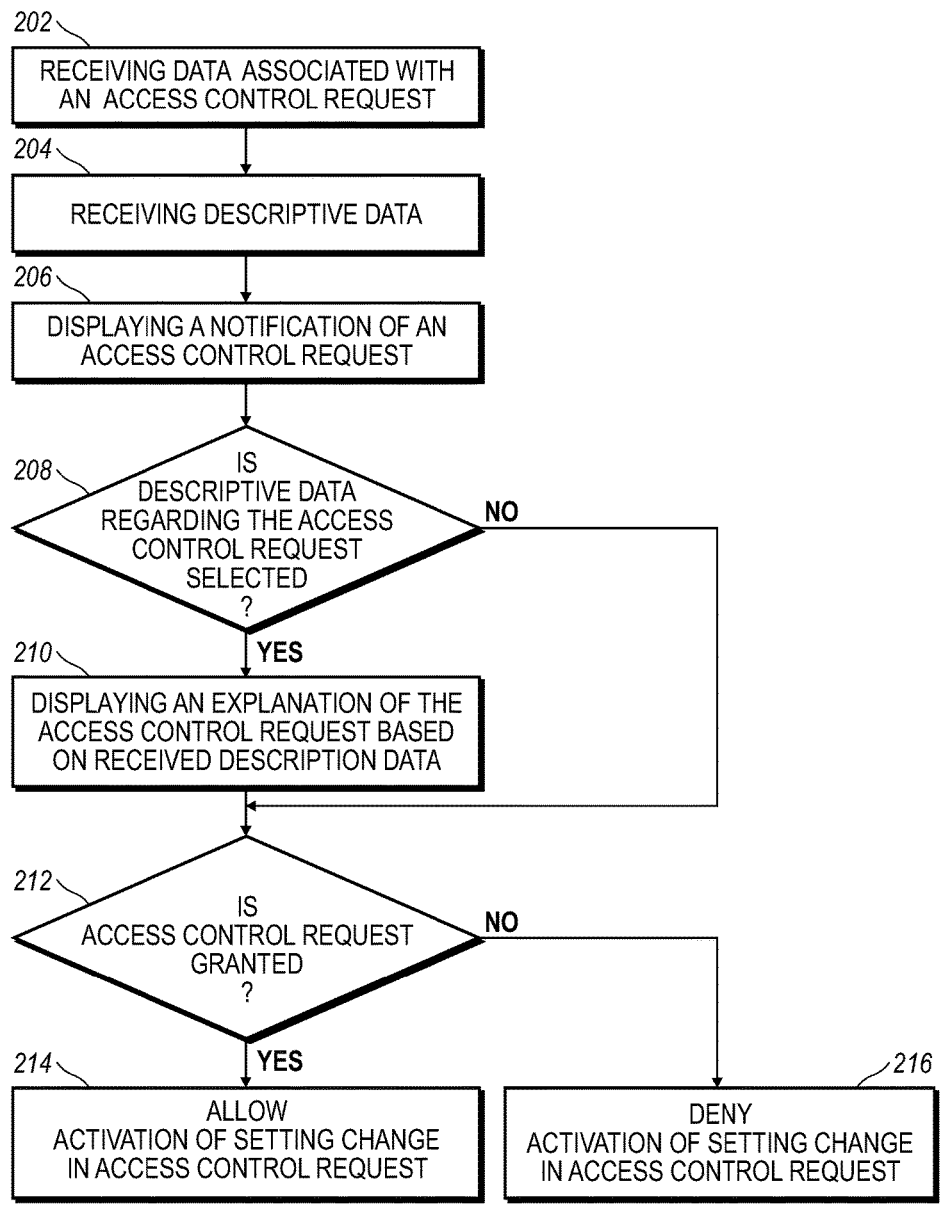
FIG. 10 illustrates an exemplary flow chart of a method according to the present disclosure.

An exemplary communication device 300 is shown in FIG. 1, and the device's cooperation in a wireless network 319 is exemplified in the block diagram of FIG. 9. These figures are exemplary only, and those persons skilled in the art will appreciate the additional elements and modifications necessary to make the communication device 300 work in particular network environments. While in the illustrated embodiment, the communication device 300 comprises a handheld communication device, and in this particular example, a smart phone, in other embodiments, the communication device 300 may comprise a handheld wireless communication device, a personal digital assistant (PDA), laptop computer, desktop computer, a server, or other communication device.

As shown in the block diagram of FIG. 9, the communication device 300 includes a microprocessor 338 that controls the operation of the communication device 300. A communication subsystem 311 performs all communication transmission and reception with the wireless network 319. Additionally, in at least one embodiment, the microprocessor 338 can be connected to a serial port (for example, a Universal Serial Bus port) 330 which can allow for communication with other devices or systems via the serial port 300. A display 322 can be connected to microprocessor 338 to allow for displaying of information to an operator of the device. When the communication device 300 is equipped with a keyboard 332, the keyboard can also be connected with the microprocessor 338. The communication device 300 can include a speaker 334, a microphone 336, random access memory (RAM) 326, and flash memory 324 all of which may be connected to the microprocessor 338.

A location positioning device 341 can be functionally connected with the microprocessor 338. The location positioning device 341 can comprise a global position system (GPS) device. The GPS device can be a module or a specially designed microprocessor that is capable of receiving signals from GPS satellites and determining current location. The signals transmitted by the GPS satellites can be information relating to time. The GPS module or microprocessor processes this information to obtain a current position. In another embodiment, the location positioning device comprises a device that makes use of wireless carrier signals to determine location.

Other similar components may be provided on the device as well and optionally connected to the microprocessor 338. Other communication subsystems 340 and other communication device subsystems 342 are generally indicated as being functionally connected with the microprocessor 338 as well. An example of a communication subsystem 340 is that of a short range communication system such as BLUETOOTH® communication module or a WI-FI® communication module (a communication module in compliance with IEEE 802.11b) and associated circuits and components. Additionally, the microprocessor 338 is able to perform operating system functions and enables execution of programs on the communication device 300. In some embodiments, not all of the above components may be included in the communication device 300. For example, in at least one embodiment the keyboard 332 is not provided as a separate component and is instead integrated with a touchscreen as described below.

The auxiliary I/O subsystem 328 can take the form of a variety of different navigation tools (multi-directional or single-directional) such as a trackball navigation tool 321 as illustrated in the exemplary embodiment shown in FIG. 1, or a thumbwheel, a navigation pad, a joystick, touch-sensitive interface, or other I/O interface. These navigation tools may be located on the front face 370 of the communication device 300 or may be located on any exterior surface of the communication device 300. Other auxiliary I/O subsystems can include external display devices and externally connected keyboards (not shown). While the above examples have been provided in relation to the auxiliary I/O subsystem 328, other subsystems capable of providing input or receiving output from the communication device 300 are considered within the scope of this disclosure. Additionally, other keys may be placed along the side of the communication device 300 to function as escape keys, volume control keys, scrolling keys, power switches, or user programmable keys, and may likewise be programmed accordingly.

Keys, typically of a push-button or push-pad nature, perform well as data entry devices but present problems to the operator when they must also be used to effect navigational control over a screen-cursor. In order to solve this problem, the present communication device 300 may include an auxiliary input that acts as a cursor navigation tool 327 and which is also exteriorly located upon the front face 370 of the communication device 300. Its front face location allows the tool to be easily thumb-actuable like the keys of the keyboard 332. An embodiment provides the navigation tool 327 in the form of a trackball 321, which can be utilized to instruct two-dimensional screen cursor movement in substantially any direction as well as act as an actuator when the trackball 321 is depressed like a button. The placement of the navigation tool 327 may be above the keyboard 332 and below the display screen 322; here, it can avoid interference during keyboarding and does not block the operator's view of the display screen 322 during use. (See FIG. 1).

As illustrated in FIG. 1, the communication device 300 may be configured to send and receive messages. The communication device 300 includes a body 371. A display 322 which is located on the front face 370 of the body 371 and upon which information is displayed to the operator during text entry. The communication device 300 may also be configured to send and receive voice communications such as mobile telephone calls.

Furthermore, the communication device 300 is equipped with components to enable operation of various programs, as shown in FIG. 9. In an exemplary embodiment, the flash memory 324 is enabled to provide a storage location for the operating system 357, device programs 358, and data. The operating system 357 is generally configured to manage other programs 358 that are also stored in memory 324 and executable on the processor 338. The operating system 357 honors requests for services made by programs 358 through predefined program 358 interfaces. More specifically, the operating system 357 typically determines the order in which multiple programs 358 are executed on the processor 338 and the execution time allotted for each program 358, manages the sharing of memory 324 among multiple programs 358, handles input and output to and from other device subsystems 342, and so on. In addition, operators can typically interact directly with the operating system 357 through a user interface usually including the keyboard 332 and display screen 322. While in an exemplary embodiment the operating system 357 is stored in flash memory 324, the operating system 357 in other embodiments is stored in read-only memory (ROM) or similar storage element (not shown). As those skilled in the art will appreciate, the operating system 357, device program 358 or parts thereof may be loaded in RAM 326 or other volatile memory.

In one exemplary embodiment, the flash memory 324 contains programs 358 for execution on the communication device 300 including an address book 352, a personal information manager (PIM) 354, and the device state 350. Furthermore, programs 358 and other information 356 including data can be segregated upon storage in the flash memory 324 of the communication device 300.

When the communication device 300 is enabled for two-way communication within the wireless communication network 319, it can send and receive signals from a mobile communication service. Examples of communication systems enabled for two-way communication include, but are not limited to, the General Packet Radio Service (GPRS) network, the Universal Mobile Telecommunication Service (UMTS) network, the Enhanced Data for Global Evolution (EDGE) network, the Code Division Multiple Access (CDMA) network, Evolution Data Only (EV-DO), High-Speed Packet Access (HSPA) networks, Universal Mobile Telecommunication Service Time Division Duplexing (UMTS-TDD), Ultra Mobile Broadband (UMB) networks, Worldwide Interoperability for Microwave Access (Wi-MAX), and other networks that can be used for data and voice, or just data or voice. For the systems listed above, the communication device 300 may require a unique identifier to enable the communication device 300 to transmit and receive signals from the communication network 319. Other systems may not require such identifying information. GPRS and EDGE use a Subscriber Identity Module (SIM) in order to allow communication with the communication network 319. Likewise, most CDMA systems use a Removable Identity Module (RUIM) in order to communicate with the CDMA network. Similarly, UMTS uses a Universal Subscriber Identity Module (USIM) in order to allow communication with the UMTS network. The SIM/RUIM/USIM card can be used in multiple different communication devices 300. The communication device 300 may be able to operate some features without a SIM/RUIM/USIM card, but it will not be able to communicate with the network 319. A SIM/RUIM/USIM interface 344 located within the communication device 300 allows for removal or insertion of a SIM/RUIM/USIM card (not shown). The SIM/RUIM/USIM card features memory and holds key configurations 351, and other information 353 such as identification and subscriber related information. With a properly enabled communication device 300, two-way communication between the communication device 300 and communication network 319 is possible.

If the communication device 300 is enabled as described above or the communication network 319 does not require such enablement, the two-way communication enabled communication device 300 is able to both transmit and receive information from the communication network 319. The transfer of communication can be from the communication device 300 or to the communication device 300. In order to communicate with the communication network 319, the communication device 300 in the presently described exemplary embodiment is equipped with an integral or internal antenna 318 for transmitting signals to the communication network 319. Likewise the communication device 300 in the presently described exemplary embodiment is equipped with another antenna 316 for receiving communication from the communication network 319. These antennae (316, 318) in another exemplary embodiment are combined into a single antenna (not shown). As one skilled in the art would appreciate, the antenna or antennae (316, 318) in another embodiment are externally mounted on the communication device 300.

When equipped for two-way communication, the communication device 300 features a communication subsystem 311. As is understood in the art, this communication subsystem 311 is modified so that it can support the operational needs of the communication device 300. The subsystem 311 includes a transmitter 314 and receiver 312 including the associated antenna or antennae (316, 318) as described above, local oscillators (LOs) 313, and a processing module 320 which in the presently described exemplary embodiment is a digital signal processor (DSP) 320.

It is contemplated that communication by the communication device 300 with the wireless network 319 can be any type of communication that both the wireless network 319 and communication device 300 are enabled to transmit, receive and process. In general, these can be classified as voice and data. Voice communication generally refers to communication in which signals for audible sounds are transmitted by the communication device 300 through the communication network 319. Data generally refers to all other types of communication that the communication device 300 is capable of performing within the constraints of the wireless network 319.

Example device programs that can depend on such data include email, contacts and calendars. For each such program synchronization with home-based versions on the programs can be desirable for either or both of their long term and short term utility. As an example, emails are often time sensitive, so substantially real time synchronization may be desired. Contacts, on the other hand, can be usually updated less frequently without inconvenience. Therefore, the utility of the communication device 300 is enhanced when connectable within a communication system, and when connectable on a wireless basis in a network 319 in which voice, text messaging, and other data transfer are accommodated.

While the above description generally describes the systems and components associated with a handheld communication device, the communication device 300 could be another communication device such as a PDA, a laptop computer, desktop computer, a server, or other communication device. In those embodiments, different components of the above system might be omitted in order provide the desired communication device 300. Additionally, other components not described above may be required to allow the communication device 300 to function in a desired fashion. The above description provides only general components and additional components may be required to enable the system to function. These systems and components would be appreciated by those of ordinary skill in the art.

While communication devices 300 continue to include additional comments or controllable functions and features, programmers or third party providers may wish to use these additional features on the communication devices 300. While these additional features can be of benefit to the operator, these additional functions and features maybe accessed without the consent of the operator. Operators might also be concerned with increased usage fees, reduced handheld wireless communication device performance, and other similar issues when the program adjusts or modifies device settings. In order to protect operators, device manufacturers may disable the ability of an executing program to access this information without informing the operator. It may also be desirable to improve the user interface associated with the communication devices so that operators can be informed about access control requests from an executing program. As described below, operators can be informed of details concerning how the requesting program will make use of the setting that is contained in the access control request. This assists in the situation where it would be otherwise confusing to the operator of the device as to how the requesting program will use the access control request or what portion of the access control request will be changed. An additional advantage is that later installed third party programs can present detailed messages to the operator when setting changes are being proposed, rather than relying on a more general manufacturer notification. In this way, the third party program can provide a more detailed and customized explanation concerning the access control request. This tailored explanation of the access request allows the executing program that is making the request to provide a context for the request, a reason for the request, or other information that aids the operator in making the determination whether or not to grant the access control request.

The examples presented herein below provide illustrations of how a notification program can be programmed to provide an explanation of an access control request based upon descriptive data received on the display screen 322. In at least one embodiment, the descriptive data is received from an executing program on the communication device 300. The illustrative examples are examples only and other arrangements and characterizations of the notifications can be possible. Also, the illustrated examples discuss the flow of data from an executing program and other arrangements may be implemented as well.

Figure 2:
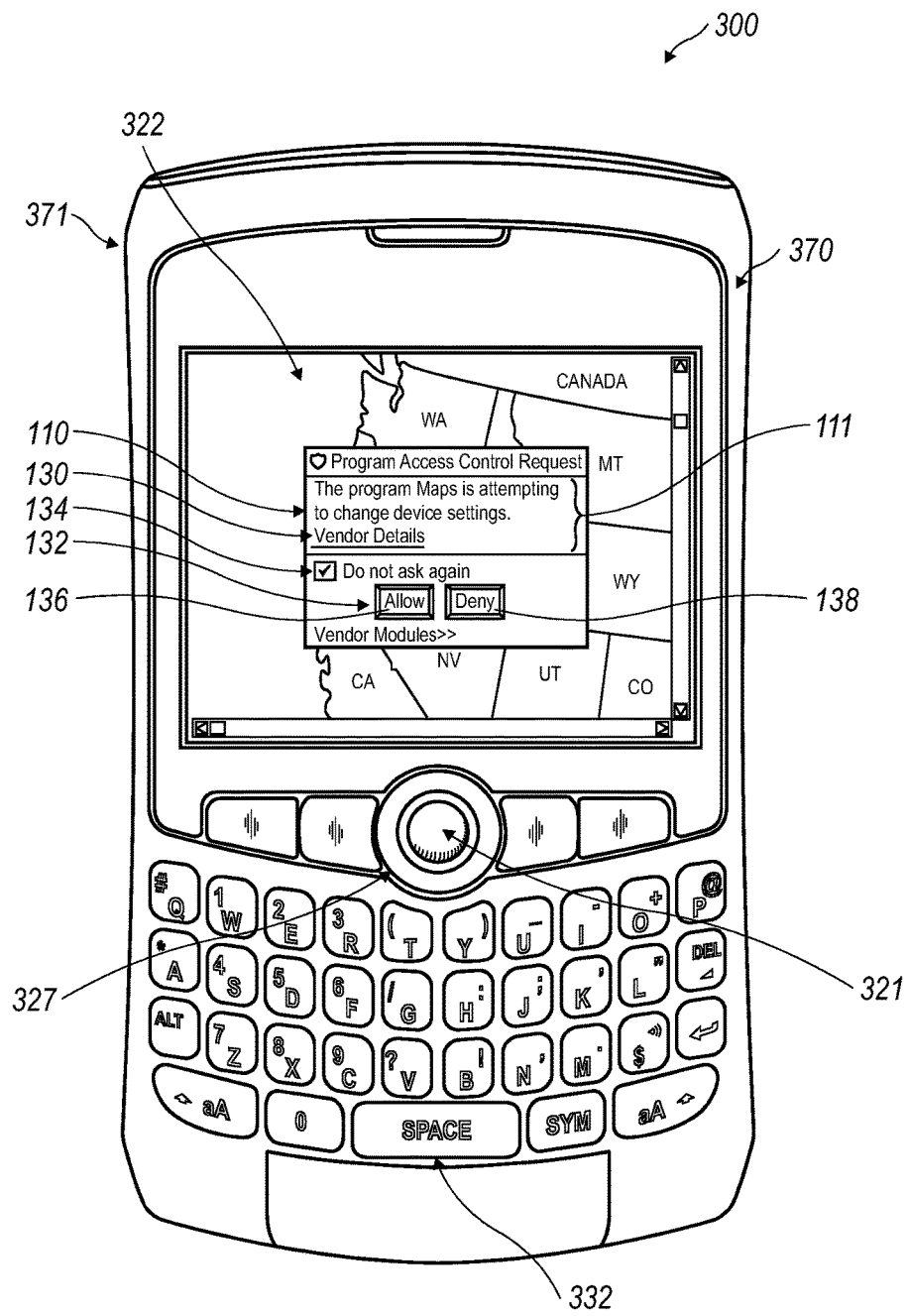
FIG. 2 illustrates another exemplary communication device according to various embodiments of the present disclosure.
Figure 3:
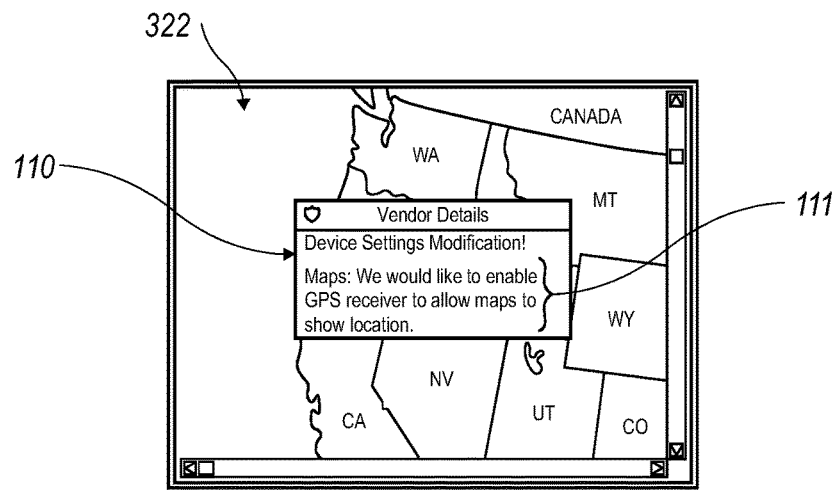
FIG. 3 is an illustrative embodiment of a notification providing an explanation of an access control request.

In one example illustrated in FIGS. 1-3, a Maps program is provided on the communication device 300. As illustrated in FIG. 1, a map, illustrating the western part of the United States, is provided on the display screen 322. While the Maps program can be used without location information, many operators or software providers may desire to include location information as part of the Maps program. When location information is included as part of the Maps program, the current location or current position along a proposed route can be displayed on the screen. In some instances, the location positioning device on the communication device 300 may be disabled until it is enabled by the operator. Additionally, the location positioning device may be selectively disabled to conserve battery life, limit the ability of others to track movement of the communication device 300, or for other reasons.

If the Maps program makes an access control request to enable the location positioning device, a notification 110, such as the one illustrated in FIG. 2, can be displayed indicating the access control request. In FIG. 2, the notification 110 indicates which program is making the access control request (illustrated by the denotation "The program Maps"). While the indication of the program making the access control request is optional, the name of the program can assist the operator in making the determination to grant or deny the access control request.

In the embodiment illustrated in FIG. 2, a notification 110 is presented on the display screen 322 of the communication device. The notification 110 is indicative of an access control request from a Maps program. The notification 110 can provide an explanation 111 of the access control request based on received data descriptive of the access control request. At a first level, the notification illustrated in FIG. 2 includes an explanation 111 that the program Maps is attempting to change device settings. The setting of the device that is requested to be changed can be described as a proposed setting change. The proposed setting that the Maps program is requesting permission to change can comprise a hardware setting change. In another embodiment, the proposed setting change can comprise a program setting change. In the illustrated example, the notification 110 comprises an explanation 111 that the device settings will be modified.

Additionally, the notification 110 is provided with a selectable item 130 (such as selectable text or dialog boxes) which allows a selection to have additional details displayed. In this example, a further explanation is displayed in response to selecting the selectable item 130 labeled "Vendor Details." Additionally, the notification 110 can include dialog boxes 132 which are used to grant the access control request and deny the access control request. As illustrated, two dialog boxes 132 are provided—one dialog box labeled "Allow" 136 grants the access control request and another dialog box labeled "Deny" 138 does not grant the requested access control request. A third dialog box labeled "Do not ask again" 134 allows the operator to make a selection that will allow the selected access control request to continue to grant or deny the access control request.

A further explanation of the access control request may be provided upon receipt of, e.g., selection of the selectable text 130 or via a provided dialog box (not shown). When the selectable text 130 is selected, a notification 110 indicative of an explanation 111 of the access control request based upon the received descriptive data is presented on the display screen 322, as illustrated in FIG. 3. The received descriptive data provides details concerning the proposed setting change of the access control request. In this example, the proposed setting change is to enable a GPS receiver. When the explanation 111 is displayed, it provides information that the Maps program is attempting to enable a GPS receiver located on the communication device 300. Additionally, the explanation 111 also provides information that the GPS will be enabled to allow the Maps program to show location of the communication device 300 on the map. While the illustrated example concerns a GPS receiver, other location positioning devices may be enabled instead of or in addition to the GPS receiver depending upon the access control request and the equipment supplied on the communication device 300. While this and the following illustrative examples include particular words and phrases, it can be appreciated that other phrases or sentences indicating similar or equivalent information are considered within the scope of this disclosure.

After the notification 110 illustrated in FIG. 3 is displayed, the display may return to the previous notification 110 in which the access control request can be granted or denied. Once the explanation 111 of the access control request has been presented, an additional instruction can present the previous notification 110, illustrated in FIG. 2, which includes two dialog boxes 132 with the option to grant or deny the access control request of a proposed setting change. In another example, the notification 110 displaying the explanation 111 of the access control request based on the received descriptive data can be provided with a dialog box or another selectable item allowing the access control request to be accepted or denied (not shown). Alternatively, the explanation 111 can be temporarily provided on the display screen or the device 300 can be provided with an escape key so that the display screen returns to the original notification 110 which includes accept or deny selections. Other arrangements can be provided within the scope of this disclosure.

Figure 4:
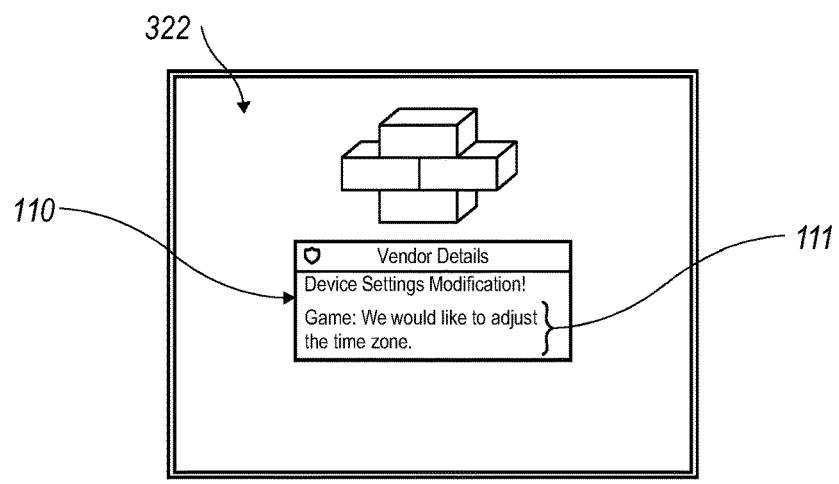
FIG. 4 is another illustrative embodiment of a notification providing an explanation of an access control request.

Other examples of access control requests along with corresponding notifications comprising explanations of the access control requests are presented below. In one example, an access control request for a time zone adjustment is made. In one embodiment, a notification 110 such as the one shown in FIG. 2 may be provided. If the device 300 receives a request for additional details as described above, the explanation 111 of the access control request describes that the time zone will be adjusted if the access control request is granted, as illustrated in FIG. 4. The notification 110 includes an explanation 111 that the time zone will be adjusted. The time zone adjustment may be requested by an executing program such as a game, calendar program, organizer, or other program. Additionally, the explanation 111 may include an additional reason that the program wishes to adjust the time zone (not shown). For example, if the program is a calendar program it may wish to adjust the time zone when the communication device 300 has received information regarding the time zone in which the communication device 300 is located. In another embodiment, a screen shot acquisition access control request can be made. The notification 110 can further include an explanation 111 that the access control request will adjust the display settings to increase a timeout function so that a video may be displayed without the display screen entering a power save mode.

Figure 5:
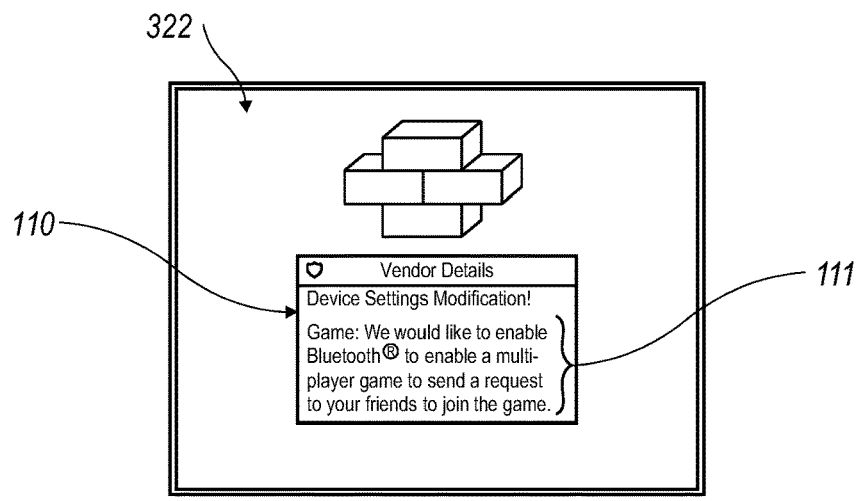
FIG. 5 is yet another illustrative embodiment of a notification providing an explanation of an access control request.

In another example, an access control request for enabling a BLUETOOTH® device is made by an executing program. As illustrated in FIG. 5, a notification 110 comprising the explanation 111 of the access control request describes enabling a BLUETOOTH® device is displayed on the display screen 322. In this example, the access control request can be for enabling a BLUETOOTH® receiver and transmitter. Additionally, the explanation 111 may provide information that BLUETOOTH® is enabled so that a multi-player game can be held or that it is going to search for communication devices 300 within close proximity to start a multiplayer game. Alternatively, only the BLUETOOTH® receiver or transmitter may be enabled and the notification 110 displays a message relating to the respective enablement of the receiver or transmitter. The enablement of the BLUETOOTH® receiver and transmitter can be in response to an access control request from a Game. In this example, the BLUETOOTH® receiver and transmitter can be used to allow the communication device 300 to transmit data in a head-to-head game with another communication device in close proximity. Other programs that use the BLUETOOTH® receiver and transmitter are also considered within the scope of this disclosure.

Figure 6:
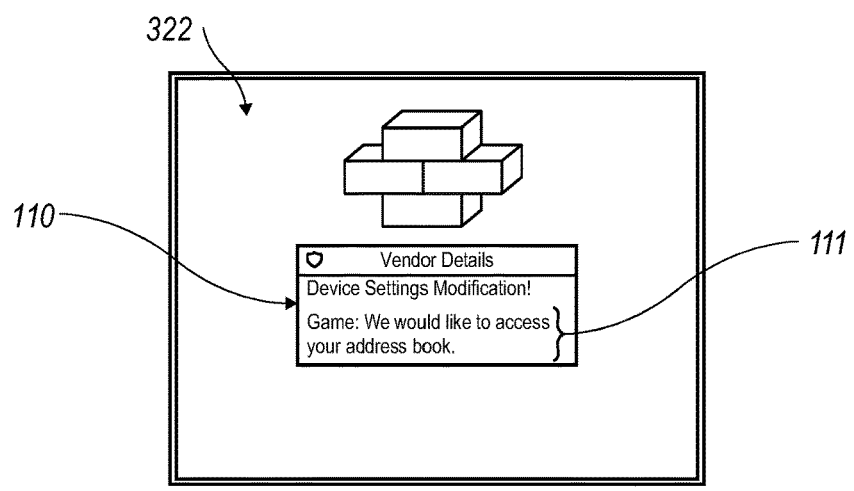
FIG. 6 is still another illustrative embodiment of a notification providing an explanation of an access control request.

In another embodiment, an access control request for accessing an address book is made by an executing program. As illustrated in FIG. 6, a notification 110 comprising the explanation 111 of the access control request describes accessing an address book on the communication device 300. For example, a Game might request access to the address book information. If a general notice is only provided to the operator, the operator might not know whether to grant or deny the access control request. When the notification program displays a notification 110 comprising an explanation 111 of the access control request based on the received descriptive data, the operator is better able to determine whether to grant or deny the access control request. For example, an operator might want to prevent a game from accessing the address book, but allow a data directory program access to the address book. As illustrated in the example, the explanation 111 indicates that the program Game would like to access the address book on the communication device 300 in order to send a request to "friends" or contacts listed in the address book to join the Game.

Additionally, an access control request for a change in the volume of the communication device 300 can be made. The access control request for a change in volume can be made by an executing program such as Game. Furthermore, an access control request for acquiring a screen shot can be made. This access control request can be made by a device management program that can be used to assist administrators in device management. In response to these requests, a notification 110 can be displayed with an explanation 111 of the access control request based on the received descriptive data related to the above mentioned access control requests. The explanations 111 would describe the adjustment of the volume of the communication device 300 and the acquisition of a screen shot respectively.

The level of detail in the explanation 111 provided in the notification 110 can vary depending on the group in which the requested setting change is located. For example, the communication device 300 may be equipped with certain settings that are grouped together under one classification such as "device settings." Those settings under "device settings" can include volume control, date adjustment, time adjustment, ringer options, power settings, and other similar settings. When the notification 110 is provided, the explanation 111 in one embodiment provides information regarding which one of the settings that are within the group is subject to the access control request. In a further embodiment, a more detailed explanation 111 provides the reason why the setting is being changed, for example to allow the program Game to access the volume control setting to set the volume to a maximum level. This more detailed explanation 111 explains that both the volume setting is to be changed and that its level is to be set to a maximum value. In other embodiments, the setting that is to be changed is a stand-alone setting, for instance BLUETOOTH® can be such a setting. In this instance, the operator is provided with an explanation 111 that includes the reason that the BLUETOOTH® setting is to be changed.

Other groupings of settings are also possible. Additionally, depending on the manufacturer settings that are grouped in some cases may also be individually provided. One example of a group of settings is theme data in which various settings relating to themes are grouped. Another grouping could be a connections setting which can control both local connections, wireless connections, and the like. Additionally, the connections could also control settings that are related to accessing the Internet, Intranet, USB connections, WI-FI® and the like. In another embodiment, the connections can be grouped according to whether the connection settings are for local, external, or internal networks. While in some instances the address book is provided in a separate setting, in others it is grouped with other "device settings." The address book also might be grouped within a personal information management (PIM) group that includes settings relating to addresses, calendars and other settings to help the operator to organize items.

In the above described embodiments, the explanation 111 of the access control request based on the received descriptive data has been presented in response to a request for additional information. In other examples, as described below, the explanation 111 of the access control request based on the received descriptive data can be provided on a single notification. While the above examples have presented a few illustrations, additional illustrations are provided below. While the illustrations are provided in relation to a single notification and two notifications, the examples of the explanations can be provided on a single or two notifications.

Figure 7:
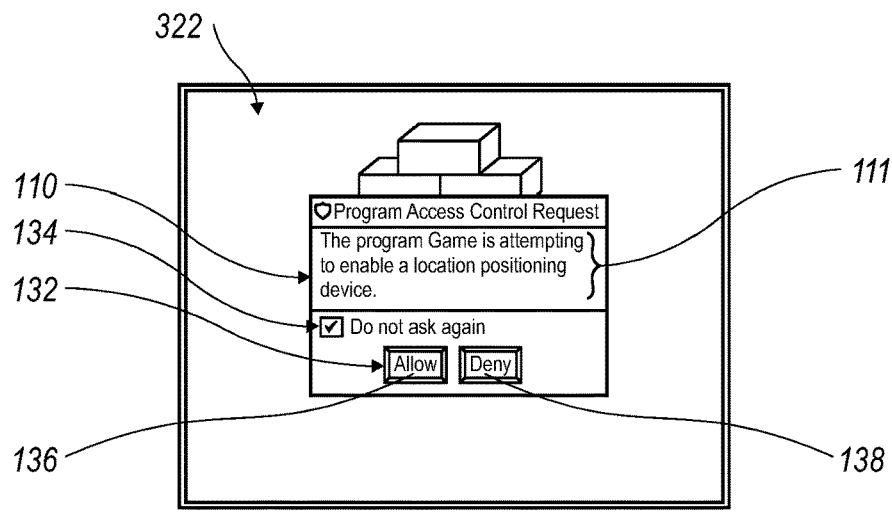
FIG. 7 is an illustrative embodiment of an access control request and an explanation of the access control request.
Figure 8:
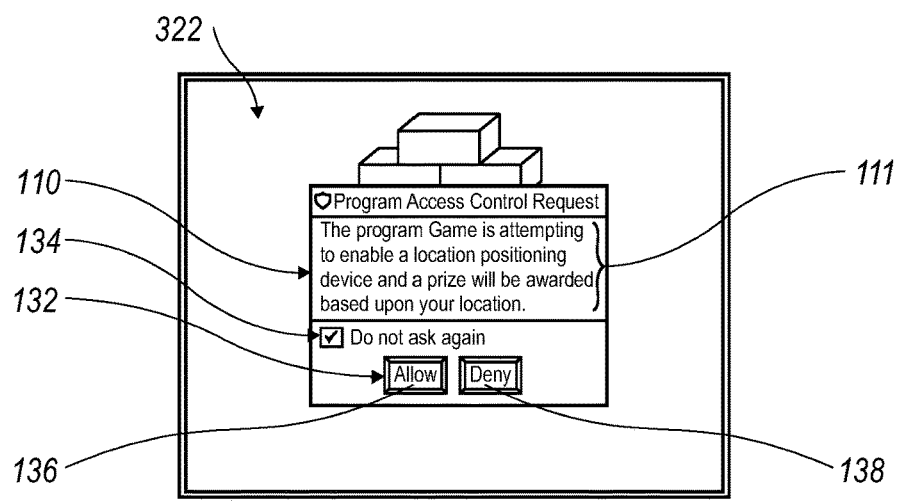
FIG. 8 is yet another illustrative embodiment of an access control request and an explanation of the access control request.

Additionally, the communication device 300 can be provided with a Game. In one embodiment as illustrated in FIG. 7, Game requests enabling a location positioning device, such as a GPS device, and a corresponding notification 110 is shown on the display screen 322. The current position could be used to improve the user experience. For example, Game could provide a list of other members of Game who are engaged in playing Game on their communication devices 300 within a predetermined distance from the communication device 300. Alternatively, local stores and restaurants could award prizes to operators who achieve preset scores or win head-to-head competitions that are located within a predetermined distance. In this embodiment, an explanation 111 of the access control request based on the received descriptive data is displayed. The received descriptive data explains that the Game is attempting to enable a location positioning device. In one embodiment as illustrated in FIG. 8, the notification 110 includes an explanation 111 that a prize will be awarded based upon a determined location if permission is granted for the access control request to enable the location positioning device. Additionally, the dialog boxes 132 may be provided, enabling allowance or denial of the access control request, as described above in relation to FIG. 2 above.

While the above embodiments have been described in relation to various programs, this disclosure is not limited to those programs. Other programs that make access control requests are included within the scope of this disclosure. In order to help the operator determine which program is making the access control request, the notification can include an indication as to which executing program is making the access control request.

In another exemplary embodiment, a method 200 for displaying notifications on a display screen 322 of a communication device 300 is presented. The method 200 includes receiving data indicative of an access control request which can be from an executing program (block 202). In at least one embodiment, the method 200 receives data descriptive of the access control request (block 204). The description of the access control request further clarifies the nature of the access control request as described above. For example, the access control request can be for adjusting volume, enabling a GPS device, accessing the address book, adjusting the time zone, acquiring a screen shot, enabling a BLUETOOTH receiver, enabling a BLUETOOTH transmitter, among others. In other embodiments, the receipt of data descriptive of the access control request can be in response to a request for additional information as will be explained below, or can be provided at the same time or in close proximity to the access control request. The method 200 further displays a notification of the access control request on the display screen of the communication device 300 (block 206). In at least one embodiment, an option to display an explanation of the access control request based upon the received descriptive data is provided (block 208). If the descriptive data regarding the access control request has not yet been received from the executing program, a request is made for the descriptive data. If the request for an explanation of the access control request is selected, a notification to that effect is presented on the display screen (block 210).

The notification 110 includes information concerning the specifics about the access control request to provide information about the setting that the access control request seeks to change. The setting can be a device hardware setting as described above. Additionally, the setting can be a device program change. In at least one embodiment, both a device hardware and device program change can be made. If the operator does not request additional information, this notification is skipped. A determination is made whether the access control request is granted or not (block 212). If the access control request is granted, then the activation of the device setting in the access control request is allowed (block 214). If the access control request is denied, then the access control request is not implemented (block 216).

The communication device 300 as described above can include a display screen upon which information is displayed. The communication device 300 can also include a speaker through which audible information can be broadcast. While the notifications described herein focus on information that is displayed on the display screen 322, the information and notification could likewise be provided audibly. Likewise, the instruction to communication device 300 could be provided through audible commands and the like. Additionally, information could be provided through vibrations or other motion of the device. Furthermore, information could be input into the communication device 300 via motion of the communication device 300 or external input device.

In one embodiment, the display screen 322 is provided within the communication device 300. In another embodiment, the display screen 322 is provided as a separate component, which can be connected to the communication device 300. A microprocessor 338 that is configured to execute at least one notification program that displays a notification 110 descriptive of an access control request on the display screen 322 can also be included. The at least one notification program can be programmed to receive data indicative of the access control request and to receive data descriptive of the access control request. The at least one notification program can further be programmed to display a notification on the display screen 322 indicative of the access control request and comprising an explanation of the access control request based on the received descriptive data.

In at least one embodiment, at least the data descriptive of the access control request is generated by, and received from an executing program on the communication device 300. In other embodiments, as described above, the access control request and data descriptive of the access control request are generated by and received from an executing program on the communication device 300. The executing program can be any program that is capable of running on the communication device 300, such as those described above. The transmission of the data descriptive of the access control request can be made at the same time as the access control request, at a different time than the access control request, or upon request of the data descriptive of the access control request.

In at least one embodiment, the access control request is a proposed setting change. In one example, the proposed setting change comprises a hardware setting change. In another example, the proposed setting change comprises a program setting change. In addition to the access control request, the explanation of the access control request can describe the proposed setting change. In one example, the explanation 111 describes that the proposed setting change is a hardware setting change. In another example, the explanation 111 describes that the proposed setting change is a program setting change. The explanation 111 can include details about the specific setting that is to be changed by the access control request. A few examples have been provided above.

As described above, the explanation 111 of the access control request can describe enabling of a location positioning device if the access control request is granted. In another example, the explanation 111 of the access control request describes obtaining a current location from a location positioning device if the access control request is granted. The location positioning device in one embodiment comprises a global positioning system device. In another embodiment the explanation 111 further describes that if the location positioning device is enabled, a prize will be awarded based upon the obtained current location.

In another example, the access control request is for a time zone adjustment and the explanation 111 of the access control request describes that the time zone will be adjusted if the access control request is granted.

A notification can describe an executing program from which the data descriptive of the access control request is received, thereby indicating which program is making the access control request. Additionally, the notification program can display the explanation 111 of the access control request in response to selection of a displayed selectable item on the display screen 322. Additionally, a dialog box 132 can be provided to grant the access control request.

In another embodiment, a computer-readable medium having a computer program for controlling a computing device to provide information pertaining to an access control request received at a communication device is presented. The computer program can cause the communication device to receive data indicative of an access control request. Additionally the computer program can cause a computer to receive data descriptive of the access control request. Furthermore, the computer program can cause the computer to display a notification on a display screen 322 indicative of the access control request and comprising an explanation of the access control request based on the receive descriptive data.

In yet another embodiment, the communication device 300 is a handheld wireless communication device configured to receive messages is disclosed. The handheld wireless communication device comprises a body 371 housing a display screen upon which information is displayed. The handheld wireless communication device can also comprise a microprocessor 338 configured to execute at least one notification program that displays a notification descriptive of an access control request on the display screen 322. The at least one notification program can be further programmed to receive data indicative of an access control request and display a dialog box 132 for additional details concerning the access control request and an explanation 111 of which executing program is making the access control request. Additionally, the at least one notification program can be further programmed to receive data descriptive of the access control request upon selection of the dialog box 132 and to display an additional notification comprising an explanation 111 of the access control request based on the received descriptive data, wherein the explanation provides additional details concerning the use of a proposed setting change of the access control request.

Exemplary embodiments have been described hereinabove regarding both communication devices 300, as well as the communication networks 319 within which they can operate. Again, it should be appreciated that the focus of the present disclosure is providing a notification indicative of an access control request and an explanation of the access control request on a display screen 322. Various modifications to and departures from the disclosed embodiments will occur to those having skill in the art. The subject matter that is intended to be within the spirit of this disclosure is set forth in the following claims.

The invention claimed is:

1. A method at a communication device, the method comprising:
   receiving, at a hardware processor of the communication device, a request for changing a location-related setting on the communication device;
   receiving descriptive data comprising an indication of an intended use of the location-related setting by at least one application executable on the communication device;
   outputting at least one notification descriptive of the request;
   receiving, via a user interface of the communication device, at least one user input; and
   as a result of receiving the at least one user input, changing, by the hardware processor, the location-related setting in accordance with the request,
   the at least one notification including an explanation of the request based on the descriptive data, the explanation describing at least the intended use.

2. The method of claim 1, wherein the request comprises a request to access location information and the intended use comprises an intended use of the location information.

3. The method of claim 1, wherein the descriptive data comprises an indication of a context for the request, and the explanation of the request describes the context for the request.

4. The method of claim 1, wherein the request is from an executing application.

5. The method of claim 1, wherein receiving the request comprises receiving the request from the at least one application.

6. The method of claim 5, wherein the at least one application comprises a maps application.

7. The method of claim 1, wherein the request is for accessing a current location of the communication device.

8. The method of claim 1, wherein the request is to enable a location positioning device.

9. The method of claim 1, wherein the location-related setting comprises a hardware setting.

10. The method of claim 1, wherein the location-related setting comprises a program setting.

11. The method of claim 1, wherein the location-related setting comprises a device setting.

12. The method of claim 1, wherein the location-related setting comprises a connection setting.

13. A communication device comprising:
    a processor; and
    a memory coupled to the processor and storing processor-executable instructions that, when executed by the processor, cause the communication device to:
    receive a request for changing a location-related setting on the communication device;
    receive descriptive data, the descriptive data comprising an indication of an intended use of the location-related setting by at least one application executable on the communication device;
    output at least one notification descriptive of the request;
    receive, via a user interface of the communication device, at least one user input; and
    as a result of receiving the at least one user input, change the location-related setting in accordance with the request,
    the at least one notification including an explanation of the request based on the descriptive data, the explanation describing at least the intended use.

14. The communication device of claim 13, wherein the request comprises a request to access location information, the intended use comprises an intended use of the location information, and the explanation of the request describes the intended use of the location information.

15. The communication device of claim 13, wherein the descriptive data comprises an indication of a context for the request, and the explanation of the request describes the context for the request.

16. The communication device of claim 13, wherein the request is from an executing application.

17. A non-transitory computer-readable storage medium having computer-executable instructions for controlling a communication device, the computer-executable instructions, when executed by the processor, causing the communication device to:
    receive a request for changing a location-related setting on the communication device;
    receive descriptive data, the descriptive data comprising an indication of an intended use of the location-related setting by at least one application executable on the communication device;
    output at least one notification descriptive of the request;
    receive at least one user input; and
    as a result of receiving the at least one user input, change, by the processor, the location-related setting in accordance with the request,
    the at least one notification including an explanation of the request based on the descriptive data, the explanation describing at least the intended use.

18. The non-transitory computer-readable storage medium of claim 17, wherein the request comprises a request to access location information and the intended use comprises an intended use of the location information.

19. The non-transitory computer-readable storage medium of claim 17, wherein the descriptive data comprises an indication of a context for the request, and the explanation of the request describes the context for the request.

20. The non-transitory computer-readable storage medium of claim 17, wherein the request is from an executing application.

21. The non-transitory computer-readable storage medium of claim 17, wherein the computer-executable instructions cause the communication device to receive the request by receiving the request from the at least one application.

22. The non-transitory computer-readable storage medium of claim 21, wherein the at least one application comprises a maps application.

23. The non-transitory computer-readable storage medium of claim 17, wherein the request is for accessing a current location of the communication device.

24. The non-transitory computer-readable storage medium of claim 17, wherein the request is to enable a location positioning device.

25. The non-transitory computer-readable storage medium of claim 17, wherein the location-related setting comprises a hardware setting.

26. The non-transitory computer-readable storage medium of claim 17, wherein the location-related setting comprises a program setting.

27. The non-transitory computer-readable storage medium of claim 17, wherein the location-related setting comprises a device setting.

28. The non-transitory computer-readable storage medium of claim 17, wherein the location-related setting comprises a connection setting.

* * * * *